United States Patent
Gourishankar et al.

(10) Patent No.: US 8,282,703 B2
(45) Date of Patent: Oct. 9, 2012

(54) RARE EARTH RECOVERY FROM PHOSPHOR MATERIAL AND ASSOCIATED METHOD

(75) Inventors: Karthick Vilapakkam Gourishankar, Bangalore (IN); Alok Mani Srivastava, Niskayuna, NY (US); Prasanth Kumar Nammalwar, Bangalore (IN); Satya Kishore Manepalli, Bangalore (IN)

(73) Assignee: General Electric Company, Niskayuna, NY (US)

( * ) Notice: Subject to any disclaimer, the term of this patent is extended or adjusted under 35 U.S.C. 154(b) by 112 days.

(21) Appl. No.: 12/972,589

(22) Filed: Dec. 20, 2010

(65) Prior Publication Data

US 2012/0152062 A1    Jun. 21, 2012

(51) Int. Cl.
C22B 59/00 (2006.01)
C25C 3/34 (2006.01)

(52) U.S. Cl. ............. 75/402; 75/610; 205/560; 588/314

(58) Field of Classification Search .................... 75/402, 75/610; 205/560; 588/314
See application file for complete search history.

(56) References Cited

U.S. PATENT DOCUMENTS

| | | | |
|---|---|---|---|
| 3,937,783 A | | 2/1976 | Wamser et al. |
| 4,139,427 A | * | 2/1979 | Greinacher .................... 205/368 |
| 4,442,075 A | | 4/1984 | Rado |
| 8,137,645 B2 | * | 3/2012 | Porob et al. .................. 423/21.1 |
| 2009/0162267 A1 | | 6/2009 | Otto et al. |

FOREIGN PATENT DOCUMENTS

| | | | |
|---|---|---|---|
| CN | 101307391 A | * | 11/2008 |
| DE | 19918793 A1 | * | 11/2000 |
| EP | 0522234 A1 | | 1/1993 |
| GB | 1287240 A | | 8/1972 |

OTHER PUBLICATIONS

Machine translation of CN 101307391 A published Nov. 19, 2008.*
Attia, "Extraction and Refining of High Purity Terbium Metal From Rare Earth Resources", Mineral Processing and Extractive Metallurgy Review, Oct. 1990, vol. 7, Issue 2, pp. 95-114.
Tooru et al., "Separation and Recovery of Rare Earth Elements from Phosphor Sludge in Processing Plant of Waste Fluorescent Lamp by Pneumatic Classification and Sulfuric Acidic Leaching", Journal of the Mining and Materials Processing Institute of Japan, 2001, vol. 117, Issue 7, Abstract 1.
Shimizu et al., "Supercritical Fluid Extraction of Rare Earth Elements from Luminescent Material in Waste Fluorescent Lamps", The Journal of Supercritical Fluids, Mar. 2005, vol. 33, Issue 3, pp. 235-241.

* cited by examiner

*Primary Examiner* — George Wyszomierski
*Assistant Examiner* — Tima M McGuthry Banks
(74) *Attorney, Agent, or Firm* — Francis T. Coppa

(57) ABSTRACT

A method for recovering at least one rare earth element from a phosphor is presented. The method includes a halogenation step (a) and a reduction step (b). The phosphor is first halogenated in a molten salt to convert at least one rare earth constituent contained therein to a soluble rare earth halide. Then, the rare earth halide in the molten salt can be reduced, to convert the rare earth halide to a rare earth element in its elemental state. A method for individually recovering multiple rare earth elements from a phosphor is also presented.

24 Claims, 4 Drawing Sheets

US 8,282,703 B2

RARE EARTH RECOVERY FROM PHOSPHOR MATERIAL AND ASSOCIATED METHOD

BACKGROUND

The invention relates generally to a method for recovering rare earth elements from a phosphor material, for example, from phosphor waste. More particularly, the invention relates to a method for recovering rare earth elements from a phosphor material by a pyrometllurgical approach.

A phosphor is a luminescent material that absorbs radiation energy in a portion of the electromagnetic spectrum, and emits energy in another portion of the electromagnetic spectrum. Phosphors of one important class are crystalline inorganic compounds of high chemical purity, and of controlled composition, to which small quantities of other elements (called "activators") have been added to convert them into efficient fluorescent materials. With the appropriate combination of activators and inorganic compounds, the color of the emission can be controlled. Phosphors are widely applied, commercially, in various systems or devices, with an annual volume growth of approximately 5%. Major applications are in emissive displays, fluorescent lamps and cathode ray tubes (CRT's).

Rare-earth doped phosphors (also referred to as rare earth phosphors) play a critical and indispensable role as fluorescent materials in lighting and display applications. Usually, rare earth phosphor based devices exhibit a relatively high efficiency. The common triphosphor blend of fluorescent lamps generates red light via the emission of trivalent europium; blue light via the emission of divalent europium; and green light via the emission of trivalent terbium. Other commonly used rare earths include yttrium, samarium, praseodymium, cerium, lanthanum and gadolinium. A blend of red, green and blue phosphors is typically used for white light emission in display devices and fluorescent lamps.

A large amount of waste phosphor material is recovered from manufacturing residues and disposed devices. The disposed phosphor waste is a potential source of rare earth elements that could be recovered. It is of ecological as well as economic interest to recover or recycle phosphor materials, and especially expensive rare earth elements, which are essential for many applications other than phosphors. Examples of the applications include fabricating different alloys, preparing rare earth magnets, and preparing various types of catalysts.

Most of the prior attempts at rare earth recovery have focused on discarded fluorescent lamps, or computer displays. A few attempts were also made for recovering rare earths from waste phosphors, by pneumatic separation, or by a chemical method. However, these approaches may not always be economically suitable, because of their cost-intensive complexity and/or their time-consuming nature.

It would therefore be desirable to develop new methods for efficiently recovering rare earths from fluorescent materials—especially from phosphor waste.

BRIEF DESCRIPTION

In one embodiment, a method for recovering at least one rare earth element from a rare earth-containing phosphor material is disclosed. The method includes a halogenation step (a) and a reduction step (b). The phosphor is first halogenated in a molten salt to convert at least one rare earth constituent contained therein to a soluble rare earth halide. Then, the rare earth halide in the molten salt can be reduced to convert the rare earth halide to a rare earth element in its elemental state.

Another embodiment is a method in which halogenation and reduction steps are carried out simultaneously in a single step. The method comprises reduction of a phosphor electrolytically in a molten salt, and in the presence of a halogenting agent, to separate rare earth elements.

In one embodiment, a method for individually recovering multiple rare earth elements from a phosphor material is disclosed. The method includes a halogenation step (a) and a reduction step (b). The phosphor is first halogenated in a molten salt to convert multiple rare earth constituents contained therein, to soluble rare earth halides. Then, the rare earth halides in the molten salt can be reduced selectively, to convert the rare earth halides to rare earth elements in their elemental state.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
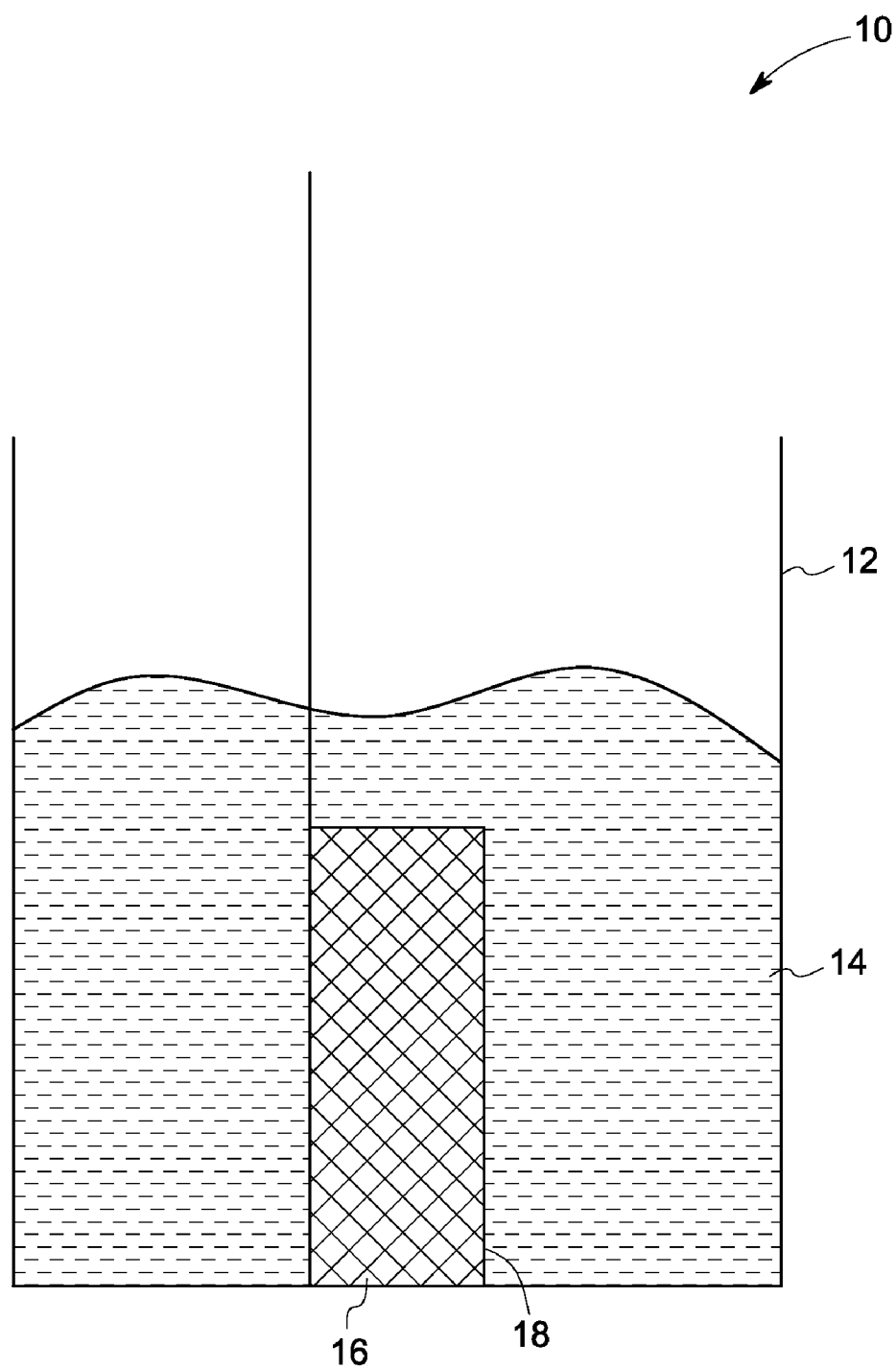
FIG. 1 is a schematic of an apparatus to carry out halogenation step (a), in accordance with one embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

As discussed in detail below, some of the embodiments of the present invention provide a method of recovering rare earths (rare earth metals) from rare earth-containing phosphor material. These embodiments advantageously provide an improved method for recovery of rare earths. Though the present discussion provides examples in the context of recovery from phosphors, these processes can be applied to other rare earth containing materials or oxides.

As used herein, the term "rare earth constituents" refers to rare earth metals in elemental form or in salt form, or rare earth metal oxides.

As used herein, the term "rare earth elements" refers to rare earth metals in elemental form.

As used herein, the term "phosphor" or "phosphor material" usually refers to rare earth-activated phosphors. Moreover, the term "phosphor" or "phosphor material" refers to waste phosphor materials or phosphor waste, either used or unused, which typically arises during production, or during the disposal of different devices. For example, waste phosphors are often collected during recycling of end-of-life or waste fluorescent lamps. These phosphors or waste phosphors may be contaminated by lamp components such as glass, metal, plastic and mercury. Most embodiments of the invention are based on the assumption that the phosphor material is free of such contamination. In one embodiment, the phosphor contains at least a blue phosphor, a red phosphor or a green phosphor. The blue, red and green phosphors are so called or known after the color of their light emission. Table 1 shows typical examples and compositions of phosphors, along with the proportion (by weight) of rare earths, used in fluorescent lamps. In another embodiment, the phosphor contains a blend of blue, red and green phosphors.

TABLE 1

| Emission | Product | Formula | Rare earths % |
|---|---|---|---|
| Blue | BAM | $BaMgAl_{10}O_{17}:Eu^{2+}$ | 2.5 |
|  | SECA | $(Sr,Ca,Ba)_5(PO_4)_3Cl:Eu^{2+}$ |  |
| Green | CAT | $(Ce,Tb)MgAl_{11}O_{19}$ | 25 |
|  | LAP | $LaPO_4:Ce^{3+},Tb^{3+}$ | 70 |
|  | CBT | $(Gd,Mg)B_5O_{10}:Ce^{3+},Tb^{3+}$ | 50 |
| Red | YEO | $Y_2O_3:Eu^{3+}$ | 100 |
|  | YVO | $YVO_4:Eu^{3+}$ | 55 |

According to one embodiment of the invention, a method of recovering a rare earth from a phosphor is provided. The method is less complex than prior art methods, and involves fewer processing steps, while producing high quality material. The recovered rare earths may be directly usable in different rare earth applications. In first step (a), the phosphor is halogenated in a molten salt (i.e., according to a molten salt halogenation reaction), to convert the rare earth constituent contained therein to a soluble rare earth halide. The soluble rare earth halide is then reduced to convert it to a rare earth element in step (b).

FIG. 1 illustrates an apparatus 10 to perform halogenation step (a). The apparatus 10 includes a reaction vessel 12, which may be made of a metal or a ceramic material. The apparatus 10 can be placed in a furnace for high temperature reactions. A molten salt 14 is poured or otherwise directed into the reaction vessel 12. The molten salt 14 usually includes at least one or more salts selected from the group consisting of lithium chloride (LiCl), sodium chloride (NaCl), potassium chloride (KCl), magnesium chloride ($MgCl_2$) and calcium chloride ($CaCl_2$). In one embodiment, a mixture of at least two salts is suitable for the purpose. Examples of such molten salt combinations are LiCl—KCl and LiCl—$CaCl_2$. In one embodiment, the molten salt 14 is a eutectic mixture of two or more salts.

Halogenation is a chemical reaction that incorporates halogen into a substance or a molecule. It results in the formation of a chemical bond between the halogen atom and another atom. Halogenation reactions can be subdivided in several ways, for example, according to the type of halogen (fluorine, chlorine, bromine, or iodine), type of material to be halogenated (inorganic, organic, aromatic, hydrogen, and so on), and operating conditions and methods of catalyzing or initiating the reaction.

A halogenating agent (not shown) may be used to carry out halogenation step (a). An amount of the halogenating agent is combined (e.g., by mixing) with the molten salt 14. In one embodiment, the halogenating agent includes a chloride, a bromide, a fluoride, an iodide, or combinations thereof. Non-limiting examples of suitable halogenating agents may include iron chloride, aluminum chloride, sodium tetrachloroaluminate, and rare earth chlorides. In some instances, a halogen gas can be used, for example, in-situ generated halogen gas. An amount of the halogenating agent sufficient for the purpose may range from about 50 percent to about 200 percent of the required stoichiometric amount.

A phosphor material 16 is placed in the reaction vessel 12, in contact with the molten salt 14 and the halogenating agent. In one embodiment, the phosphor material 16 can be dispersed within the molten salt 14. In another embodiment, the phosphor material 16 can be filled in a mesh basket 18, as shown in FIG. 1. The mesh basket 18 may be made of a metal, such as stainless steel. A porous ceramic such as magnesium oxide (MgO) or porous graphite may also be used. The phosphor material 16 is typically a multi-element complex compound, which decomposes into a mixture of different halides upon halogenation. The mixture includes halides of constituents of the phosphor, for example, halides of alkali, alkaline earth and rare earth metals. Therefore, after halogenation step (a), the molten salt 14 contains soluble halides. Rare earth halides are usually soluble in the molten salt 14.

Apart from the presence of the halogenating agent, the feasibility of the molten salt halogenation reaction of the phosphor depends on several other parameters. These include, for example, the amount of the phosphor, relative to the amount of the molten salt; as well as the reaction temperature. The amount of phosphor may be at least about 10 weight percent, relative to the amount of the molten salt. In some embodiments, the amount of phosphor may range from about 10 weight percent to about 30 weight percent, and in certain embodiments, from about 15 weight percent to about 20 weight percent, relative to the amount of the molten salt.

Halogenation of the phosphor is usually performed at a temperature close to the eutectic temperature of the molten salt used. For example, the reaction temperature may be greater than about 300 degrees Celsius, when the eutectic temperature is in that approximate range. In one embodiment, the halogenation step (a) is performed at a temperature within the range of about 300 degree Celsius to about 650 degree Celsius.

The method described herein further includes a reduction step (b), which involves reduction of the rare earth halides in the molten salt obtained from step (a). Reduction may be performed electrolytically or chemically. Chemical reduction may be achieved by adding controlled amounts of lithium or sodium metal to the molten salt solution containing soluble rare earth halides.

Figure 2:
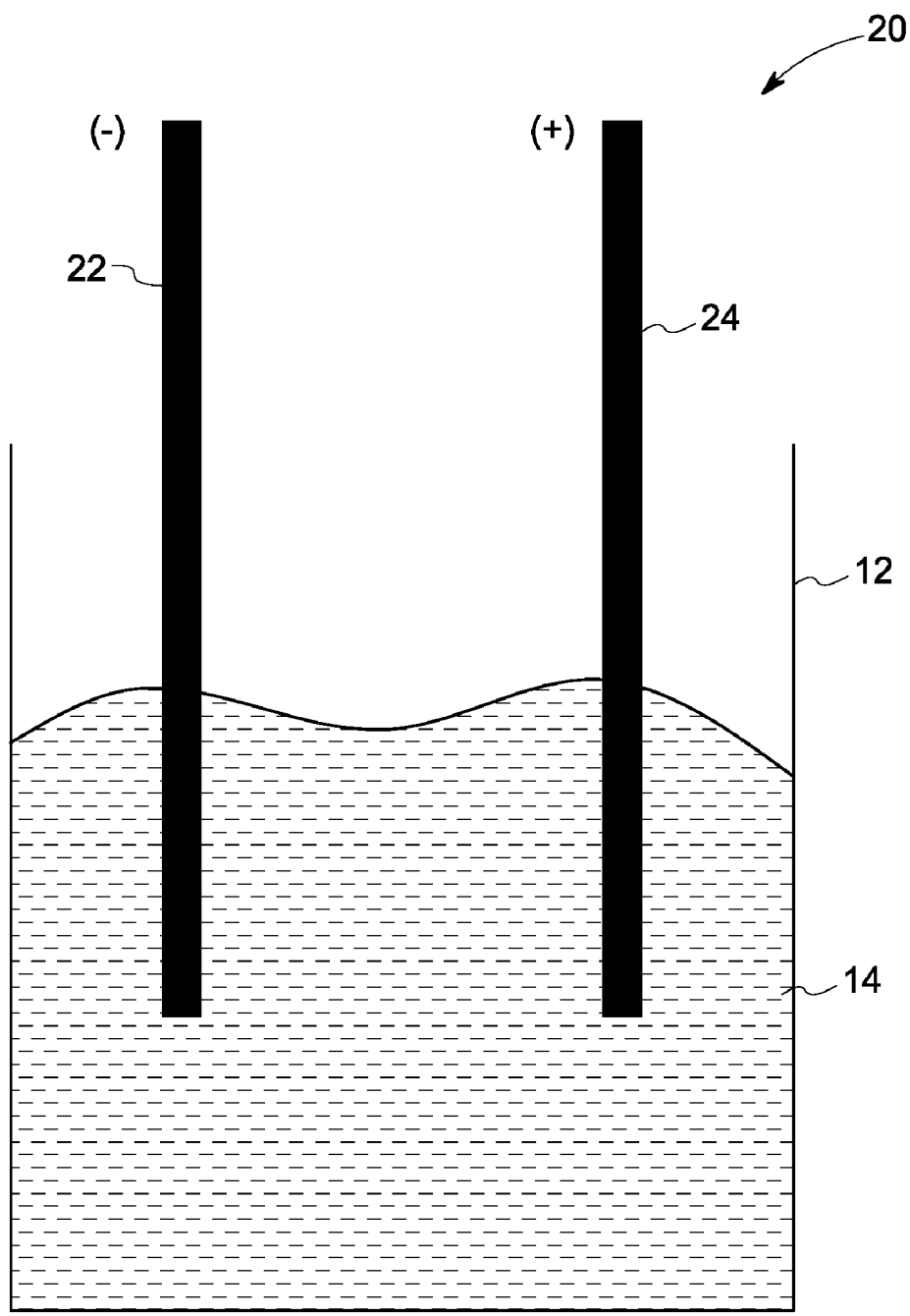
FIG. 2 is a schematic of an apparatus to carry out reduction step (b), in accordance with one embodiment of the invention.

FIG. 2 illustrates an apparatus 20, suitable for carrying out the electrolytic reduction of the rare earth halides, in one embodiment. The mesh basket 18 (shown in FIG. 1), which contains the solid phosphor material, has been removed after halogenation in the reaction vessel 12. A cathode 22 and an anode 24 are placed in the molten salt 14 containing soluble halides. A metal may be used for the cathode 22. Non-limiting examples of suitable metals may include platinum, gold, copper, cadmium and aluminum. A chlorine electrode, for example graphite, may be used for the anode 24. A potential is applied between the cathode 22 and the anode 24, to perform electrolytic reduction of the rare earth halide, to a rare earth element. The reduced rare earth element gets deposited and collected on the cathode 22. In one embodiment, the potential may range from about 0.5 volt to about 1.5 volts, relative to an $Al/Al^{3+}$ reference electrode.

In some embodiments, the phosphor may contain multiple rare earth constitutents. For example, a phosphor or blend of phosphors may contain terbium, cerium and europium. As every chemical species is characterized by an electrochemical potential for a given oxidation/reduction reaction system in which the species is incorporated, the species can be selectively processed. In some embodiments, multiple rare earth constituents may be processed and selectively reduced to its elemental form to recover individual rare earth element. Selective reduction depends on various operating parameters, e.g. cathode potential and temperature, and design of the apparatus used for electrolytic reduction, e.g. appropriate selection of cathode. In those embodiments, the mixture may be processed under such conditions, to individually and selectively extract one type of rare earth element at a time from that particular phosphor. For example, terbium can be selectively extracted by performing the reduction step at about 2.80 volts, at about 500 degrees Celsius. Cerium can be selectively extracted at about 2.98 V, at about 500 degrees Celsius.

Figure 3:
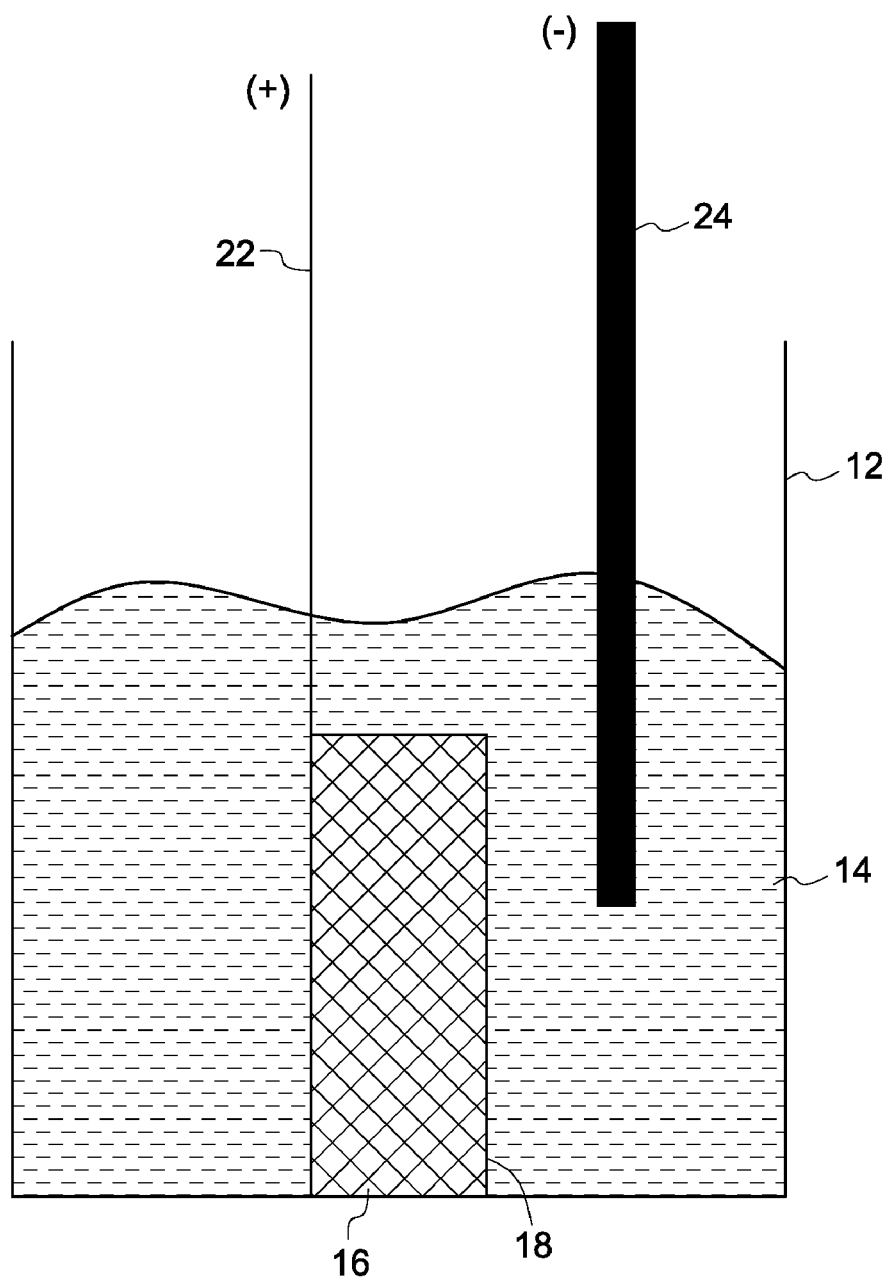
FIG. 3 is a schematic of an apparatus, in accordance with another embodiment of the invention.

In some embodiments, halogenation step (a) and reduction step (b) may be performed simultaneously. FIG. 3 illustrates such an embodiment. The mesh basket 18 is connected to a positive terminal, to function as a cathode 22 and, an appropriate anode 24 is placed in the reaction vessel 12. The rare earth element is deposited on the cathode 22, on application of a voltage; and the rare-earth constituent in the anode is halogenated to a soluble species by the halogen gas generated in-situ, during the electrolysis process.

The above-discussed method advantageously provides selective extraction of rare earth elements with high purity. Recovery of rare earth metals, in elemental form, permits re-use of these metals in fluorescent material production, or in any other application. Furthermore, the present method is a relatively economic and rapid process to recover rare earth elements from a phosphor, as compared to currently available methods. (Usually, other processes form rare earth oxides, and recovery of rare earth elements is undertaken at various steps).

The above-described method of recovering rare earth elements can be very easily exploited for use on an industrial production line.

EXAMPLES

The example that follows is merely illustrative, and should not be construed to be any sort of limitation on the scope of the claimed invention.

Example 1

Recovery of Terbium from Green Phosphor

Two samples were prepared. Sample 1 was prepared by mixing 90 weight percent of a eutectic KCl—LiCl melt, and 10 weight percent of green phosphor $La_{0.6}Ce_{0.27}Tb_{0.13}PO_4$ (LAP). Sample 2 contained 80 weight percent of a eutectic KCl—LiCl melt, 20 weight percent of green phosphor, $La_{0.6}Ce_{0.27}Tb_{0.13}PO_4$ (LAP) and 180 weight percent of stoichiomtrically required aluminum chloride. A chlorination step was performed for each sample within argon-atmosphere glovebox, at about 475 degrees Celsius. Electrolytic reduction was performed by using aluminum wires for the cathode and anode. A voltage was slowly increased from 0 to about 1.5 volts. A cyclic-voltametery test was performed to analyze formation of chlorides before and after electrolytic reduction step.

Figure 4:
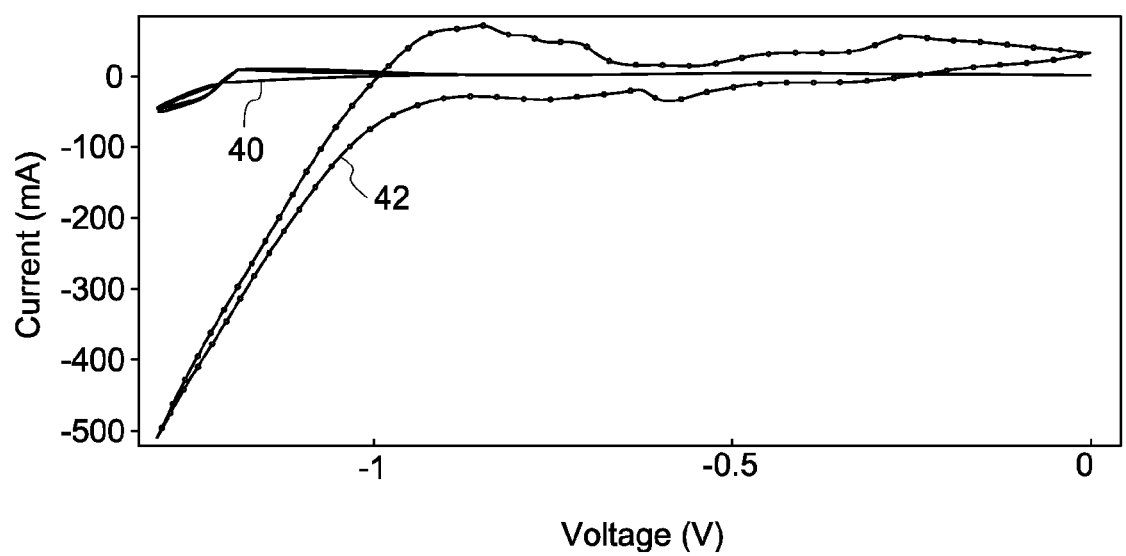
FIG. 4 is a graph showing results of cyclic-voltametery test for two samples, in accordance with an exemplary embodiment of the invention.

FIG. 4 is a graph showing results of the cyclic-voltametery test for the two samples. Curve 40 corresponds to sample 1, and curve 42 corresponds to sample 2. It is clear from the graph that no current was produced for sample 1. Curve 42 shows the generation of current with increasing voltage, as well as multiple oxidation/reduction reactions. These results demonstrate that sample 2 contained rare earth chlorides ($LaCl_3$, $CeCl_3$ and $TbCl_3$) that were dissolved in the melt. This was also confirmed by ICP analysis of equilibrated molten salt, with and without the halogenation agent. Sample 1, without the halogenation agent, shows no soluble rare-earths. Sample 2 shows significant amounts of soluble rare-earth halides in the molten salt. These chlorides are capable of being reduced to their elemental form.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for recovering at least one rare earth element from a phosphor, comprising the steps of:
    a) halogenating the phosphor in a molten salt, to convert at least one rare earth constituent contained therein to a soluble, rare earth halide; and
    b) reducing the rare earth halide in the molten salt, to convert the rare earth halide to a rare earth element in its elemental state.

2. The method of claim 1, wherein the phosphor comprises phosphor waste.

3. The method of claim 2, wherein the phosphor waste comprises fluorescent lamp waste material.

4. The method of claim 1, wherein the phosphor comprises at least a blue phosphor, a red phosphor or a green phosphor.

5. The method of claim 1, wherein the molten salt comprises one or more salts selected from the group consisting of sodium chloride, potassium chloride and lithium chloride.

6. The method of claim 1, wherein the halogenation is carried out in presence of a halogenation agent.

7. The method of claim 6, wherein the halogenation agent comprises a chloride, a fluoride, a bromide or an iodide.

8. The method of claim 6, wherein the halogenation agent comprises aluminum chloride, iron chloride, or combinations thereof.

9. The method of claim 6, wherein the halogenation agent is present in an amount ranging from about 50 percent to about 200 percent of the required stoichiometric amount.

10. The method of claim 1, wherein the reducing step (b) comprises electrolytic reduction.

11. The method of claim 1, wherein the reducing step (b) comprises chemical reduction.

12. The method of claim 1, wherein steps (a) and (b) are both carried out at a temperature higher than about 100 degrees Celsius.

13. A method for recovering at least one rare earth element from a rare earth containing phosphor, comprising reducing the phosphor electrolytically in a molten salt, and in the presence of a halogenating agent, to separate rare earth elements from the phosphor in their elemental state.

14. A method for individually recovering multiple rare earth elements from a phosphor, comprising the steps of:
   a) halogenating the phosphor in a molten salt, to convert multiple rare earth contituents contained therein to soluble, rare earth halides; and
   b) selectively reducing rare earth halides in the molten salt, to convert the rare earth halides to rare earth elements in their elemental state.

15. The method of claim 14, wherein the phosphor comprises phosphor waste.

16. The method of claim 15, wherein the phosphor waste comprises fluorescent lamp waste material.

17. The method of claim 14, wherein the phosphor comprises at least a blue phosphor, a red phosphor or a green phosphor.

18. The method of claim 14, wherein the molten salt comprises one or more salts selected from the group consisting of sodium chloride, potassium chloride and lithium chloride.

19. The method of claim 14, wherein the halogenation is carried out in presence of a halogenation agent.

20. The method of claim 19, wherein the halogenation agent comprises a chloride, a fluoride, a bromide or an iodide.

21. The method of claim 19, wherein the halogenation agent comprises aluminum chloride, iron chloride, or combinations thereof.

22. The method of claim 14, wherein the reducing step (b) comprises electrolytic reduction.

23. The method of claim 14, wherein the reducing step (b) comprises chemical reduction.

24. The method of claim 14, wherein steps (a) and (b) are both carried out at a temperature higher than about 100 degrees Celsius.

* * * * *